US012570915B2

(12) United States Patent (10) Patent No.: US 12,570,915 B2
Mizutani et al. (45) Date of Patent: Mar. 10, 2026

(54) REFRIGERATOR OIL, AND WORKING FLUID COMPOSITION

(71) Applicant: ENEOS CORPORATION, Tokyo (JP)

(72) Inventors: Yuya Mizutani, Tokyo (JP); Yuma Seki, Tokyo (JP); Motoya Okazaki, Tokyo (JP); Hidetoshi Ogata, Tokyo (JP); Masaki Kawaguchi, Tokyo (JP)

(73) Assignee: ENEOS CORPORATION, Tokyo (JP)

( * ) Notice: Subject to any disclaimer, the term of this patent is extended or adjusted under 35 U.S.C. 154(b) by 0 days.

(21) Appl. No.: 18/859,313

(22) PCT Filed: Apr. 24, 2023

(86) PCT No.: PCT/JP2023/016117
§ 371 (c)(1),
(2) Date: Oct. 23, 2024

(87) PCT Pub. No.: WO2023/210580
PCT Pub. Date: Nov. 2, 2023

(65) Prior Publication Data
US 2025/0263619 A1 Aug. 21, 2025

(30) Foreign Application Priority Data
Apr. 28, 2022 (JP) ................................. 2022-075136

(51) Int. Cl.
| *C10M 105/38* | (2006.01) |
| *C09K 5/04* | (2006.01) |
| *C10M 169/04* | (2006.01) |
| *C10M 171/00* | (2006.01) |
| *C10N 20/00* | (2006.01) |
| *C10N 30/02* | (2006.01) |
| *C10N 30/06* | (2006.01) |
| *C10N 30/10* | (2006.01) |
| *C10N 40/30* | (2006.01) |

(52) U.S. Cl.
CPC ............. *C10M 105/38* (2013.01); *C09K 5/04* (2013.01); *C10M 169/04* (2013.01); *C10M 171/008* (2013.01); *C10M 2207/026* (2013.01); *C10M 2207/042* (2013.01); *C10M 2207/2835* (2013.01); *C10M 2223/041* (2013.01); *C10N 2020/103* (2020.05); *C10N 2030/02* (2013.01); *C10N 2030/06* (2013.01); *C10N 2030/10* (2013.01); *C10N 2040/30* (2013.01)

(58) Field of Classification Search
CPC .............. C10M 105/38; C10M 169/04; C10M 171/008; C10M 2207/2835; C10M 2223/041; C09K 5/04; C10N 2030/02; C10N 2030/06; C10N 2030/10; C10N 2040/30
USPC ....................................................... 508/485
See application file for complete search history.

(56) References Cited

U.S. PATENT DOCUMENTS

| | | | | | |
|---|---|---|---|---|---|
| 4,627,192 | A | * | 12/1986 | Fick ........................ | A01H 1/104 |
| | | | | | 800/274 |
| 5,773,391 | A | * | 6/1998 | Lawate ................ | C10M 105/38 |
| | | | | | 508/491 |
| 6,774,093 | B2 | * | 8/2004 | Carr ........................ | C09K 5/045 |
| | | | | | 252/68 |
| 6,878,677 | B1 | * | 4/2005 | Sakanoue ............ | C10M 105/38 |
| | | | | | 508/513 |
| 6,998,065 | B1 | * | 2/2006 | Hasegawa .......... | C10M 171/008 |
| | | | | | 508/495 |
| 7,052,626 | B1 | * | 5/2006 | Hasegawa .............. | C09K 5/045 |
| | | | | | 508/495 |
| 8,067,345 | B2 | * | 11/2011 | Tokiai ................ | C10M 171/008 |
| | | | | | 508/494 |
| 8,865,015 | B2 | * | 10/2014 | Carr ........................ | C09K 5/045 |
| | | | | | 252/68 |
| 2004/0147411 | A1 | * | 7/2004 | Bongardt ................ | C07C 69/58 |
| | | | | | 508/281 |
| 2022/0332996 | A1 | * | 10/2022 | Nagai ................ | C10M 171/008 |

FOREIGN PATENT DOCUMENTS

| | | |
|---|---|---|
| EP | 0 712 834 A1 | 5/1996 |
| JP | 05-59388 A | 3/1993 |
| JP | 08-208563 A | 8/1996 |
| JP | 08-259980 A | 10/1996 |
| JP | 2010-90284 A | 4/2010 |

(Continued)

OTHER PUBLICATIONS

Extended European Search Report that issued in the corresponding EP Patent Application No. 23796320.2 dated Jun. 3, 2025.
Translation of the International Search Report that issued in International Patent Application No. PCT/JP2023/016117, mailed Jul. 18, 2023.
Translation of the International Preliminary Report on Patentability that issued in International Patent Application No. PCT/JP2023/016117, mailed Nov. 7, 2024.

*Primary Examiner* — Ellen M Mcavoy

(74) *Attorney, Agent, or Firm* — Greenblum & Bernstein, P.L.C.

(57) ABSTRACT

A refrigerating machine oil that can ensure the residual amount of an anti-wear agent. The refrigerating machine oil comprises an ester of a polyhydric alcohol and a fatty acid having 14 to 20 carbon atoms as a base oil, and an anti-wear agent. The fatty acid having 14 to 20 carbon atoms comprises an unsaturated fatty acid, which includes an unsaturated fatty acid having one carbon-carbon unsaturated bond and an unsaturated fatty acid having two or more carbon-carbon unsaturated bonds. The proportion of the unsaturated fatty acid having two or more carbon-carbon unsaturated bonds is 20% by mole or less based on the total amount of the unsaturated fatty acid.

6 Claims, No Drawings

(56)         References Cited

FOREIGN PATENT DOCUMENTS

| | | | |
|---|---|---|---|
| JP | 2011-236275 | A | 11/2011 |
| WO | 2022/009931 | A1 | 1/2022 |

* cited by examiner

REFRIGERATOR OIL, AND WORKING FLUID COMPOSITION

TECHNICAL FIELD

The present invention relates to a refrigerating machine oil and a working fluid composition.

BACKGROUND ART

Refrigerating machines such as refrigerators, car conditioners, room air conditioners, and vending machines are equipped with compressors to circulate refrigerants within the refrigeration cycle. These compressors are filled with refrigerating machine oil to lubricate sliding members. Generally, refrigerating machine oil contains a base oil and additives selected according to desired properties.

For example, Patent Document 1 discloses a refrigerating machine oil for a hydrocarbon refrigerant which can achieve both low viscosity and maintenance of refrigerant dissolution viscosity, as well as compatibility with refrigerants and maintenance of refrigerant dissolution viscosity, and which contains an ester of a fatty acid with the proportion of linear fatty acids having 10 to 22 carbon atoms of 50 to 100% by mole and a polyhydric alcohol.

CITATION LIST

Patent Documents

[Patent Document 1] JP 2010-90284 A

SUMMARY OF INVENTION

Technical Problem

In refrigerating machine oil, one of the commonly used additives along with the base oil is an anti-wear agent. According to the studies by the inventors of the present invention, it has been found that when a specific ester is used as the base oil, the composition of the fatty acids constituting the ester can cause the anti-wear agent to decompose easily. If the anti-wear agent decomposes easily, the amount of the anti-wear agent remaining in the refrigerating machine oil decreases, potentially preventing the expected anti-wear function from being fully exhibited.

Therefore, one aspect of the present invention aims to provide a refrigerating machine oil that can ensure the residual amount of the anti-wear agent.

Solution to Problem

The inventors of the present invention have found that in an ester of a polyhydric alcohol and a fatty acid having 14 to 20 carbon atoms, when the fatty acid contains unsaturated fatty acids, the number of carbon-carbon unsaturated bonds (hereinafter also referred to as "C=C bonds") in the unsaturated fatty acids affects the residual amount of the anti-wear agent in the refrigerating machine oil using the ester as the base oil and the anti-wear agent as an additive. More specifically, it has been found that when the proportion of unsaturated fatty acids having two or more C=C bonds in the unsaturated fatty acids is within a specific range, the residual amount of the anti-wear agent can be ensured in the refrigerating machine oil containing the ester of a polyhydric alcohol and a fatty acid having 14 to 20 carbon atoms as the base oil and the anti-wear agent.

The present invention includes the following aspects (1) to (7):

(1) A refrigerating machine oil containing an ester of a polyhydric alcohol and a fatty acid having 14 to 20 carbon atoms, as a base oil, and an anti-wear agent, wherein the fatty acid having 14 to 20 carbon atoms contains an unsaturated fatty acid, the unsaturated fatty acid contains an unsaturated fatty acid having one carbon-carbon unsaturated bond and an unsaturated fatty acid having two or more carbon-carbon unsaturated bonds, and a proportion of the unsaturated fatty acid having two or more carbon-carbon unsaturated bonds is 20% by mole or less based on a total amount of the unsaturated fatty acid.

(2) The refrigerating machine oil according to (1), wherein the proportion of the unsaturated fatty acid having two or more carbon-carbon unsaturated bonds is 2% by mole or more based on the total amount of the unsaturated fatty acid.

(3) The refrigerating machine oil according to (1) or (2), wherein the unsaturated fatty acid having one carbon-carbon unsaturated bond comprises oleic acid.

(4) The refrigerating machine oil according to any one of (1) to (3), wherein the unsaturated fatty acid having two or more carbon-carbon unsaturated bonds comprises linoleic acid.

(5) The refrigerating machine oil according to any one of (1) to (4), further containing an antioxidant, wherein the proportion of the unsaturated fatty acid having two or more carbon-carbon unsaturated bonds is 10% by mole or more based on the total amount of the unsaturated fatty acid.

(6) A working fluid composition containing the refrigerating machine oil according to any one of (1) to (5) and a refrigerant.

(7) The working fluid composition according to (6), wherein the refrigerant contains a hydrocarbon.

Advantageous Effects of Invention

According to one aspect of the present invention, it is possible to provide the refrigerating machine oil that can ensure the residual amount of the anti-wear agent.

DESCRIPTION OF EMBODIMENTS

Hereinafter, embodiments of the present invention will be described in detail. One embodiment of the present invention is refrigerating machine oil containing an ester of a polyhydric alcohol and a fatty acid having 14 to 20 carbon atoms as a base oil, and an anti-wear agent.

The polyhydric alcohol may be an alcohol having 2 to 6 hydroxyl groups. The polyhydric alcohol may be an aliphatic alcohol. Examples of the polyhydric alcohol include dihydric alcohols such as neopentyl glycol, propanediol, butanediol, and pentanediol; trihydric alcohols such as trimethylolethane, trimethylolpropane, trimethylolbutane, glycerin, and 1,3,5-pentanetriol; and tetra- to hexa-hydric alcohols such as pentaerythritol and dipentaerythritol. The polyhydric alcohol is preferably at least one selected from dihydric alcohols and trihydric alcohols, more preferably a trihydric alcohol. The trihydric alcohol is preferably trimethylolpropane.

The fatty acid having 14 to 20 carbon atoms (hereinafter also referred to as "C14-C20 fatty acid") contains at least an unsaturated fatty acid (unsaturated fatty acid having 14 to 20 carbon atoms). The unsaturated fatty acid contains an unsaturated fatty acid (first unsaturated fatty acid) having one carbon-carbon unsaturated bond (carbon-carbon double bond, C=C bond) and an unsaturated fatty acid (second unsaturated fatty acid) having two or more carbon-carbon unsaturated bonds (carbon-carbon double bond, C=C bond).

Examples of the first unsaturated fatty acid include physeteric acid, myristoleic acid, palmitoleic acid, heptadecenoic acid, petroselinic acid, elaidic acid, oleic acid, and vaccenic acid. The first unsaturated fatty acid preferably contains oleic acid, more preferably contains oleic acid and palmitoleic acid.

The number of C=C bonds in the second unsaturated fatty acid may be, for example, 2 to 4, preferably 2. Examples of the second unsaturated fatty acid include linoleic acid, linolelaidic acid, hiragonic acid, linolenic acid, and arachidonic acid. The second unsaturated fatty acid preferably contains linoleic acid.

The proportion of the second unsaturated fatty acid is 20% by mole or less based on the total amount of the unsaturated fatty acid. This ensures the residual amount of the anti-wear agent in the refrigerating machine oil. In one embodiment, the proportion of the second unsaturated fatty acid, based on the total amount of the unsaturated fatty acid, may be preferably 19.5% by mole or less, 19% by mole or less, or 18.6% by mole or less, and may be preferably 15% by mole or less, 12% by mole or less, or 10% by mole or less from the viewpoint of further ensuring the residual amount of the anti-wear agent. In another embodiment, the proportion of the second unsaturated fatty acid, based on the total amount of the unsaturated fatty acid, may be preferably 8% by mole or less, 7.5% by mole or less, 7% by mole or less, 6.5% by mole or less, or 6% by mole or less from the viewpoint of ensuring the residual amount of the anti-wear agent while also ensuring the residual amount of the anti-oxidant when the refrigerating machine oil further contains the antioxidant. The proportion of the second unsaturated fatty acid, based on the total amount of the unsaturated fatty acid, may be more than 0% by mole, may be 1% by mole or more, and may be 2% by mole or more, 3% by mole or more, 5% by mole or more, 6% by mole or more, 7% by mole or more, 8% by mole or more, or 8.5% by mole or more from the viewpoint of economic efficiency, and may be preferably 9% by mole or more, 10% by mole or more, 11% by mole or more, 12% by mole or more, or 12.5% by mole or more from the viewpoint of ensuring the residual amount of the anti-wear agent while also ensuring the residual amount of the antioxidant when the refrigerating machine oil further contains the antioxidant.

In other words, the proportion of the first unsaturated fatty acid is 80% by mole or more based on the total amount of the unsaturated fatty acid. In one embodiment, the proportion of the first unsaturated fatty acid may be preferably 80.5% by mole or more, 81% by mole or more, or 81.4% by mole or more based on the total amount of the unsaturated fatty acid. In another embodiment, the proportion of the first unsaturated fatty acid may be preferably 92% by mole or more, 92.5% by mole or more, 93% by mole or more, 93.5% by mole or more, or 94% by mole or more based on the total amount of the unsaturated fatty acid from the viewpoint of ensuring the residual amount of the anti-wear agent while also ensuring the residual amount of the antioxidant when the refrigerating machine oil further contains the antioxidant. The proportion of the first unsaturated fatty acid may be less than 100% by mole or 99% by mole or less based on the total amount of the unsaturated fatty acid, and may be 98% by mole or less, 97% by mole or less, 95% by mole or less, 94% by mole or less, 93% by mole or less, 92% by mole or less, or 91.5% by mole or less from the viewpoint of economic efficiency, and may be preferably 91% by mole or less, 90% by mole or less, 89% by mole or less, 88% by mole or less, or 87.5% by mole or less from the viewpoint of ensuring the residual amount of the antioxidant when the refrigerating machine oil further contains the antioxidant.

The proportions of the first unsaturated fatty acid and the second unsaturated fatty acid in the unsaturated fatty acids can be measured by $^{13}$C-NMR. Specifically, when the ester is measured by $^{13}$C-NMR, for example, peaks attributable to the C=C carbons of the first unsaturated fatty acid are observed as two peaks A around 130 ppm (128.8 to 132 ppm), and peaks attributable to the two or three C=C carbons of the second unsaturated fatty acid are observed as two peaks A (overlapping with the peaks A attributable to the first unsaturated fatty acid) around 130 ppm (128.8 to 132 ppm) and two or four peaks B around 128 ppm (127 to 128.7 ppm). Therefore, the proportion of the second unsaturated fatty acid can be determined by the following formula from the area values PA of peaks A and PB of peaks B:

$$\text{Proportion of the second unsaturated fatty acid (\% by mole)} = PB/(PA-PB) \times 100$$

The proportion of the first unsaturated fatty acid (% by mole) can be determined by "100–the proportion of the second unsaturated fatty acid (% by mole)".

The proportions of the first unsaturated fatty acid and the second unsaturated fatty acid can be adjusted within the desired range by adjusting the mixing ratio of the first unsaturated fatty acid and the second unsaturated fatty acid when synthesizing the ester.

The content of unsaturated fatty acids, based on the total amount of the C14-C20 fatty acids, may be 70% by mass or more, 75% by mass or more, 80% by mass or more, 85% by mass or more, or 90% by mass or more, and may be 95% by mass or less or 93% by mass or less.

In one embodiment, the C14-C20 fatty acids may further contain a saturated fatty acid (saturated fatty acid having 14 to 20 carbon atoms) in addition to the unsaturated fatty acid. Examples of the saturated fatty acid include tetradecanoic acid, pentadecanoic acid, hexadecanoic acid, heptadecanoic acid, octadecanoic acid, nonadecanoic acid, and eicosanoic acid. These saturated fatty acids may be linear or branched.

The content of the saturated fatty acids, based on the total amount of the C14-C20 fatty acids, may be 1% by mass or more, 3% by mass or more, or 5% by mass or more, and may be 15% by mass or less, 12% by mass or less, or 10% by mass or less.

The content of the ester of the polyhydric alcohol and the C14-C20 fatty acids may be preferably 50% by mass or more, 60% by mass or more, 70% by mass or more, 80% by mass or more, 90% by mass or more, or 95% by mass or more, based on the total amount of the refrigerating machine oil.

The refrigerating machine oil may further contain an additional base oil other than the ester of the polyhydric alcohol and the C14-C20 fatty acids. Examples of the additional base oils include a hydrocarbon oil or an oxygen-containing oil. Examples of the hydrocarbon oil include a mineral oil, an olefin polymer, a naphthalene compound, and an alkylbenzene. Examples of the oxygen-containing oil include esters such as a monoester (an ester of a monoalcohol), a polyol ester other than the ester of the polyhydric alcohol and the C14-C20 fatty acid (an ester of a polyol having two or more hydroxyl groups), a complex ester, and ethers such as a polyalkylene glycol, a polyvinyl ether, a polyphenyl ether, and a perfluoroether.

The anti-wear agent contained in the refrigerating machine oil may be preferably a phosphorus-based anti-wear agent. The phosphorus-based anti-wear agent may be an anti-wear agent containing phosphorus as a constituent element. Examples of the phosphorus-based anti-wear agent include an orthophosphate ester, an acidic phosphate ester, an amine salt of an acidic phosphate ester, a chlorinated phosphate ester, a phosphite ester and a thiophosphate ester. The phosphorus-based anti-wear agent preferably contains an orthophosphate ester.

Examples of the orthophosphate ester include a trialkyl phosphate, a trialkenyl phosphate, and a triaryl phosphate. Examples of the trialkyl phosphate include tributyl phosphate, tripentyl phosphate, trihexyl phosphate, triheptyl phosphate, trioctyl phosphate, trinonyl phosphate, tridecyl phosphate, triundecyl phosphate, tridodecyl phosphate, tri-tridecyl phosphate, tritetra decyl phosphate, tripentadecyl phosphate, trihexadecyl phosphate, triheptadecyl phosphate, and trioctadecyl phosphate. Examples of the trialkenyl phosphate include trioleyl phosphate. Examples of the triaryl phosphate include triphenyl phosphate, tricresyl phosphate, tri(ethylphenyl) phosphate, tri(butylphenyl) phosphate, trixylenyl phosphate, cresyldiphenyl phosphate, and xylenyldiphenyl phosphate. The orthophosphate ester may be preferably selected from triphenyl phosphate and tricresyl phosphate, more preferably tricresyl phosphate.

The content of the anti-wear agent, based on the total amount of the refrigerating machine oil, may be 0.1% by mass or more, 0.5% by mass or more, or 1% by mass or more and may be 5% by mass or less, 4% by mass or less, or 3% by mass or less.

The refrigerating machine oil may further contain an additive other than the anti-wear agent. Examples of the additive other than the anti-wear agent include an antioxidant, an acid scavenger, an oiliness agent, a defoamer, a metal deactivator and a viscosity index improver. The total content of additives other than the anti-wear agent may be preferably 0.1% by mass or more, more preferably 0.5% by mass or more based on the total amount of the refrigerating machine oil, and preferably 5% by mass or less or 2% by mass or less.

The refrigerating machine oil preferably further contains the antioxidant. Examples of the antioxidants include a phenolic antioxidant and an amine antioxidant. Examples of the phenolic antioxidant include 2,6-di-tert-butyl-p-cresol, 2,6-di-tert-butylphenol, and 4,4'-methylenebis(2,6-di-tert-butylphenol). Examples of the amine antioxidant include an alkyl diphenylamine and a naphthylamine. The antioxidant preferably contains the phenolic antioxidant, more preferably contains 2,6-di-tert-butyl-4-methylphenol.

The content of the antioxidant, based on the total amount of the refrigerating machine oil, may be 0.01% by mass or more, 0.05% by mass or more, or 0.1% by mass or more, and may be 3% by mass or less, 2% by mass or less, or 1% by mass or less.

The refrigerating machine oil preferably further contains the acid scavenger, more preferably an epoxy-based acid scavenger. Examples of the epoxy-based acid scavenger include a glycidyl ester compound, a glycidyl ether compound, and an alicyclic epoxy compound. The content of the acid scavenger may be 0.1% by mass or more and may be 3% by mass or less, based on the total amount of the refrigerating machine oil.

The kinematic viscosity at 40° C. of the refrigerating machine oil may be 10 mm$^2$/s or higher, 20 mm$^2$/s or higher, 30 mm$^2$/s or higher, or 40 mm$^2$/s or higher, and may be 400 mm$^2$/s or lower, 300 mm$^2$/s or lower, 200 mm$^2$/s or lower, 100 mm$^2$/s or lower, or 60 mm$^2$/s or lower.

The kinematic viscosity at 100° C. of the refrigerating machine oil may be 4 mm$^2$/s or higher, 6 mm$^2$/s or higher, 8 mm$^2$/s or higher, or 9 mm$^2$/s or higher, and may be 40 mm$^2$/s or lower, 25 mm$^2$/s or lower, 15 mm$^2$/s or lower, 12 mm$^2$/s or lower, or 10 mm$^2$/s or lower.

The viscosity index of the refrigerating machine oil may be 110 or higher, 140 or higher, 150 or higher, 160 or higher, or 170 or higher, and may be 300 or lower, 250 or lower, or 220 or lower.

The kinematic viscosity and viscosity index in this specification refer to the kinematic viscosity and viscosity index measured in accordance with JIS K2283:2000.

The refrigerating machine oil may be used together with a refrigerant. That is, another embodiment of the present invention is a working fluid composition comprising the refrigerating machine oil and a refrigerant.

The refrigerant preferably contains a hydrocarbon. The hydrocarbon may be preferably a hydrocarbon having 2 to 4 carbon atoms. Examples of hydrocarbons include ethylene, ethane, propane (R290), propylene, cyclopropane, normal butane, isobutane (R600a), cyclobutane, and methylcyclopropane. The hydrocarbon may be preferably propane (R290) or isobutane (R600a), more preferably propane (R290).

The refrigerant may consist of the hydrocarbon, or may further contains an additional refrigerant in addition to the hydrocarbon. The content of the hydrocarbon may be 50% by mass or more, 60% by mass or more, 70% by mass or more, 80% by mass or more, 90% by mass or more, or 95% by mass or more, based on the total amount of the refrigerant. Examples of the additional refrigerant include a saturated fluorocarbon (HFC) such as R32, R134a, R125, and R143a; an unsaturated fluorocarbons (HFO) such as R1234yf and R1234ze; a fluorine-containing ether such as a perfluoroether; bis(trifluoromethyl) sulfide; trifluoroiodomethane; ammonia (R717); and carbon dioxide (R744).

The content of the refrigerating machine oil in the working fluid composition may be preferably 1 part by weight or more, or 2 parts by weight or more, based on 100 parts by weight of the refrigerant, and preferably 500 parts by weight or less, or 400 parts by weight or less.

Examples

The present invention will be further described in detail with reference to the following examples, but the present invention may be not limited to these examples.

Esters of trimethylolpropane and C14-C20 fatty acids (unsaturated fatty acids: about 92-93% by mass in base oils 1-4, 94.2% by mass in base oil 5, 91.5% by mass in base oil 6; saturated fatty acids: 7-8% by mass in base oils 1-4, 5.8% by mass in base oil 5, 8.5% by mass in base oil 6) were used as base oils 1-6. The proportions of unsaturated fatty acids having one C=C bond and unsaturated fatty acids having two or more C=C bonds in each ester (base oil) were measured by the above procedure. The results are shown in Table 1.

The unsaturated fatty acids having one C═C bond contained oleic acid and palmitoleic acid, and the proportion of oleic acid in the unsaturated fatty acids having one C═C bond was 90% by mass or more in base oils 1-4, 96.5% by mass in base oil 5, and 83% by mass in base oil 6. The unsaturated fatty acids having two or more C═C bonds contained linoleic acid, and the proportion of linoleic acid in the unsaturated fatty acids having two or more C═C bonds was 90% by mass or more in base oils 1-6.

To each of the obtained base oils 1-6, 0.3% by mass of an antioxidant (2,6-di-tert-butyl-4-methylphenol), 0.7% by mass of an acid scavenger (glycidyl neodecanoate), and 1% by mass of an anti-wear agent (tricresyl phosphate), based on the total amount of the refrigerating machine oil, were added to prepare refrigerating machine oils of Examples 1-5 and Comparative Example 1.

(Evaluation of Residual Amount of Anti-Wear Agent)

Stability test was conducted on each of the obtained refrigerating machine oils in accordance with JIS K2211-09 (autoclave test). Specifically, each refrigerating machine oil (30 g) with a water content adjusted to 1000 ppm was weighed into an autoclave, and a catalyst (iron, copper, aluminum wires, each with an outer diameter of 1.6 mm×length of 50 mm) and R290 (30 g) as a refrigerant were sealed in, followed by heating at 175° C. for 168 hours to conduct the stability test.

The content (mass) C0 of the anti-wear agent in each refrigerating machine oil before the stability test and the content (mass) C1 of the anti-wear agent in each refrigerating machine oil after the stability test were quantified using HPLC or GC, and the residual amount of the anti-wear agent was calculated by the following formula. The results are shown in Table 1.

$$\text{Residual amount of anti-wear agent (\% by mass)} = C1/C0 \times 100$$

(Evaluation of Residual Amount of Antioxidant)

For the refrigerating machine oils of Examples 1-5, the residual amount of the antioxidant was also calculated by the same method as the residual amount of the anti-wear agent. The results are shown in Table 1.

The invention claimed is:

1. A working fluid composition comprising:
a refrigerating machine oil; and
a refrigerant;
wherein
the refrigerating machine oil comprises
an ester of a polyhydric alcohol and a fatty acid having 14 to 20 carbon atoms, as a base oil, and
a phosphorus-based anti-wear agent;
the fatty acid having 14 to 20 carbon atoms comprises an unsaturated fatty acid;
the unsaturated fatty acid comprises an unsaturated fatty acid having one carbon-carbon unsaturated bond and an unsaturated fatty acid having two or more carbon-carbon unsaturated bonds;
a proportion of the unsaturated fatty acid having two or more carbon-carbon unsaturated bonds is 1% by mole or more and 20% by mole or less based on a total amount of the unsaturated fatty acid;
a content of the phosphorus-based anti-wear agent is 0.1% by mass or more; and
the refrigerant comprises a hydrocarbon.

2. The working fluid composition according to claim 1, wherein the proportion of the unsaturated fatty acid having two or more carbon-carbon unsaturated bonds is 2% by mole or more based on the total amount of the unsaturated fatty acid.

3. The working fluid composition according to claim 1, wherein the unsaturated fatty acid having one carbon-carbon unsaturated bond comprises oleic acid.

4. The working fluid composition according to claim 1, wherein the unsaturated fatty acid having two or more carbon-carbon unsaturated bonds comprises linoleic acid.

5. The working fluid composition according to claim 1, further comprising an antioxidant,
wherein the proportion of the unsaturated fatty acid having two or more carbon-carbon unsaturated bonds is 10% by mole or more based on the total amount of the unsaturated fatty acid.

TABLE 1

|  | Example 1 | Example 2 | Example 3 | Comp. Example 1 | Example 4 | Example 5 |
|---|---|---|---|---|---|---|
|  | | | | Type of base oil | | |
|  | Base oil 1 | Base oil 2 | Base oil 3 | Base oil 4 | Base oil 5 | Base oil 6 |
| Proportion of unsaturated fatty acid having one C═C bond (% by mole) | 91.3 | 87.2 | 81.4 | 79.3 | 96.1 | 94.3 |
| Proportion of unsaturated fatty acid having two or more C═C bonds (% by mole) | 8.7 | 12.8 | 18.6 | 20.7 | 3.9 | 5.7 |
| Residual amount of anti-wear agent after stability test (% by mass) | 100 | 99 | 98 | 95 | 100 | 100 |
| Residual amount of antioxidant after stability test (% by mass) | 73 | 90 | 93 | — | 93 | 93 |

6. The working fluid composition according to claim 1, further comprising an antioxidant, wherein the phosphorus-based anti-wear agent is at least one selected from an orthophosphate ester, an acidic phosphate ester, an amine salt of an acidic phosphate ester, a chlorinated phosphate ester, a phosphite ester and a thiophosphate ester.

* * * * *